United States Patent
Sakikawa et al.

(10) Patent No.: US 6,932,179 B2
(45) Date of Patent: Aug. 23, 2005

(54) HYDRAULIC FOUR-WHEEL DRIVING APPARATUS

(76) Inventors: Shigenori Sakikawa, 2-18-1, Inadera, Amagasaki-shi, Hyogo (JP); Manabu Kawakami, 2-18-1, Inadera, Amagasaki-shi, Hyogo (JP)

( * ) Notice: Subject to any disclaimer, the term of this patent is extended or adjusted under 35 U.S.C. 154(b) by 54 days.

(21) Appl. No.: 10/743,067

(22) Filed: Dec. 23, 2003

(65) Prior Publication Data

US 2004/0149506 A1 Aug. 5, 2004

(30) Foreign Application Priority Data

Dec. 27, 2002 (JP) ........................................ 2002-380207

(51) Int. Cl.[7] .............................................. B60K 17/356
(52) U.S. Cl. ........................................ 180/242; 180/305
(58) Field of Search ......................... 180/6.48, 242–246, 180/305–308

(56) References Cited

U.S. PATENT DOCUMENTS 5,207,060 A * 5/1993 Sheets ........................... 60/483
6,196,348 B1 * 3/2001 Yano et al. ................. 180/242
6,604,596 B2 * 8/2003 Bracke et al. ............... 180/242
6,637,535 B2 * 10/2003 Nemoto ...................... 180/248
6,860,354 B2 * 3/2005 Hasegawa .................... 180/242

FOREIGN PATENT DOCUMENTS

JP         2594951         12/1996

* cited by examiner

Primary Examiner—Lesley D. Morris
Assistant Examiner—L. Lum
(74) Attorney, Agent, or Firm—Sterne, Kessler, Goldstein & Fox P.L.L.C.

(57) ABSTRACT

A hydraulic four-wheel driving apparatus is provided for a vehicle having a pair of left and right unsteerable wheels and a pair of left and right steerable wheels. The hydraulic four-wheel driving apparatus comprises: a transmission casing supporting the unsteerable wheels; a hydraulic pump disposed integrally with the transmission casing, the hydraulic pump being driven by a power source outside the transmission casing; a first hydraulic motor for driving the unsteerable wheels fluidly connected to the hydraulic pump, the first hydraulic motor being disposed integrally with the transmission casing; and a second hydraulic motor for driving the steerable wheels fluidly connected to the hydraulic pump, the second hydraulic motor being disposed integrally with the transmission casing and disposed on one side of the first hydraulic motor toward the steerable wheels.

5 Claims, 6 Drawing Sheets

HYDRAULIC FOUR-WHEEL DRIVING APPARATUS

BACKGROUND OF THE INVENTION

1. Field of the Invention

The present invention relates to a hydraulic four-wheel driving apparatus for a vehicle.

2. Related Art

Conventionally, there is a well-known hydraulic four-wheel drive system for a vehicle (such as a lawn tractor) having a pair of left and right unsteerable (rear) wheels and a pair of left and right steerable (front) wheels, wherein the system includes a front-wheel speed-increasing mechanism for increasing drive speed of its front (steerable) wheels so as to prevent the front wheels from being dragged while the vehicle is turning because of uneven distance between the front wheels and the rear (unsteerable) wheels from the turning center of the vehicle when turning. With respect to the front-wheel speed-increasing mechanism disclosed in Japanese Patent No. 2,594,951, for example, one assembly unit of a hydraulic motor and a differential gearing is provided for driving the unsteerable rear wheels, and another for driving the steerable front wheels, wherein the hydraulic motor for the steerable front wheels is operated in association with steering operation, e.g., rotation of a steering wheel.

However, in the conventional front-wheel speed-increasing system, the hydraulic motor for driving the (steerable) front wheels is placed adjacent to the front wheels, thereby lengthening piping for connecting the hydraulic motor for driving the front wheels, to a hydraulic pump disposed in a transmission casing supporting the (unsteerable) rear wheels. Since a front axle casing for driving the front wheels is extended laterally to be vertically rotatable at its left and right ends around a center pivot, it is difficult to use a steel pipe for the piping. Accordingly, a flexible hose is used for the piping. However, the flexible hose may be expanded and contracted by hydraulic pressure flowing therein so as to cause power loss and high load imposed on the piping. Furthermore, the flexible hose, which is easily broken against an obstacle on the ground surface, is necessarily complicated in its piping so as to avoid obstacles.

Moreover, when the hydraulic motor for driving the front wheels is disposed near the front wheels, additional piping for circulating oil filled within its housing and for cooling the motor must be extended between the motor housing for the front wheels and the transmission casing (serving as an oil tank) supporting the rear wheels.

Additionally, a movable swash plate of the motor for driving the front wheels has no neutral position, that is, the relative oil-delivery direction of the hydraulic motor for the front wheels to that of the hydraulic pump is constant even if the movable swash plate is tilted in any direction. An especially complicated linkage is requested to accurately control such a movable swash plate in association with the steering operation, e.g., rotation of a steering wheel.

BRIEF SUMMARY OF THE INVENTION

An object of the present invention is to provide a hydraulic four-wheel driving apparatus for a vehicle having a pair of left and right first drive wheels and a pair of left and right second drive wheels, the first drive wheels and the second drive wheels being distributed between the back and front of the vehicle, and at least the second drive wheels being steerable, the apparatus including a transmission casing supporting the first drive wheels; a hydraulic pump driven by a power source outside the transmission casing, the hydraulic pump being disposed integrally with the transmission casing; and a first hydraulic motor for driving the second drive wheels fluidly connected to the hydraulic pump, the first hydraulic motor being disposed integrally with the transmission casing, wherein the apparatus is improved to eliminate piping from the transmission casing to a second hydraulic motor for driving the steerable wheels across the longitudinal center of the vehicle.

To achieve the objects, in the hydraulic four-wheel driving apparatus according to the present invention, the second hydraulic motor for driving the second drive wheels is disposed integrally with the transmission casing on one side of the first hydraulic motor toward the second drive wheels so as to be fluidly connected to the hydraulic pump.

Therefore, the second hydraulic motor for driving the steerable second drive wheels merely requires extremely shortened and simplified piping, and it requires no piping extended across a longitudinal center of a vehicle equipped with the apparatus where a mid-mount device such as a mower or an obstacle on the ground may exist. Moreover, hydraulic oil can be smoothly circulated among the pump and first and second motors while being effectively cooled, thereby improving durability of the pump and motors.

Preferably, in the hydraulic four-wheel driving apparatus, rotary axis of the second hydraulic motor is disposed lower than rotary axis of the first hydraulic motor.

Therefore, considering that rotary axis of the steerable second drive wheels is usually lower than that of the first drive wheels which may be unsteerable, inclination of a power transfer shaft for driving the steerable second drive wheels extended from the second hydraulic motor can be reduced, thereby reducing noise and frictional power loss generating from the power transfer shaft, thereby improving durability of the power transfer shaft.

Preferably, in the hydraulic four-wheel driving apparatus, the capacity of the second hydraulic motor is larger than the capacity of the first hydraulic motor. Further preferably, the second hydraulic motor has variable capacity and the minimum capacity of the second hydraulic motor is not smaller than capacity of the first hydraulic motor.

Therefore, load on the second hydraulic motor for driving the steerable second drive wheels is lightened so as to prevent the second motor from cavitation, thereby improving its durability.

Preferably, in the hydraulic four-wheel driving apparatus, the second hydraulic motor is variable in capacity and provided with a movable swash plate. A pair of left and right control arms for controlling the swash plate are linked to the respective left and right second drive wheels. Each of the control arms is operated by turning the corresponding second drive wheel by the steering operation.

When steering for either left or right turning of the vehicle (when a steering wheel is rotated either right or left from its straight traveling position), operational load is applied on only one of the control arms linked to the respective steerable second drive wheels. Therefore, the linkage between the steerable second drive wheels and the control arms is improved in durability and reliability. The control arms can be distributed on left and right sides of the second hydraulic motor, thereby ensuring simple structure of the second hydraulic motor and the linkage.

These further, and other objects, features and advantages will appear more fully from the following detailed description and accompanying drawings.

BRIEF DESCRIPTION OF THE DRAWINGS/FIGURES

DETAILED DESCRIPTION OF THE INVENTION

Figure 1:
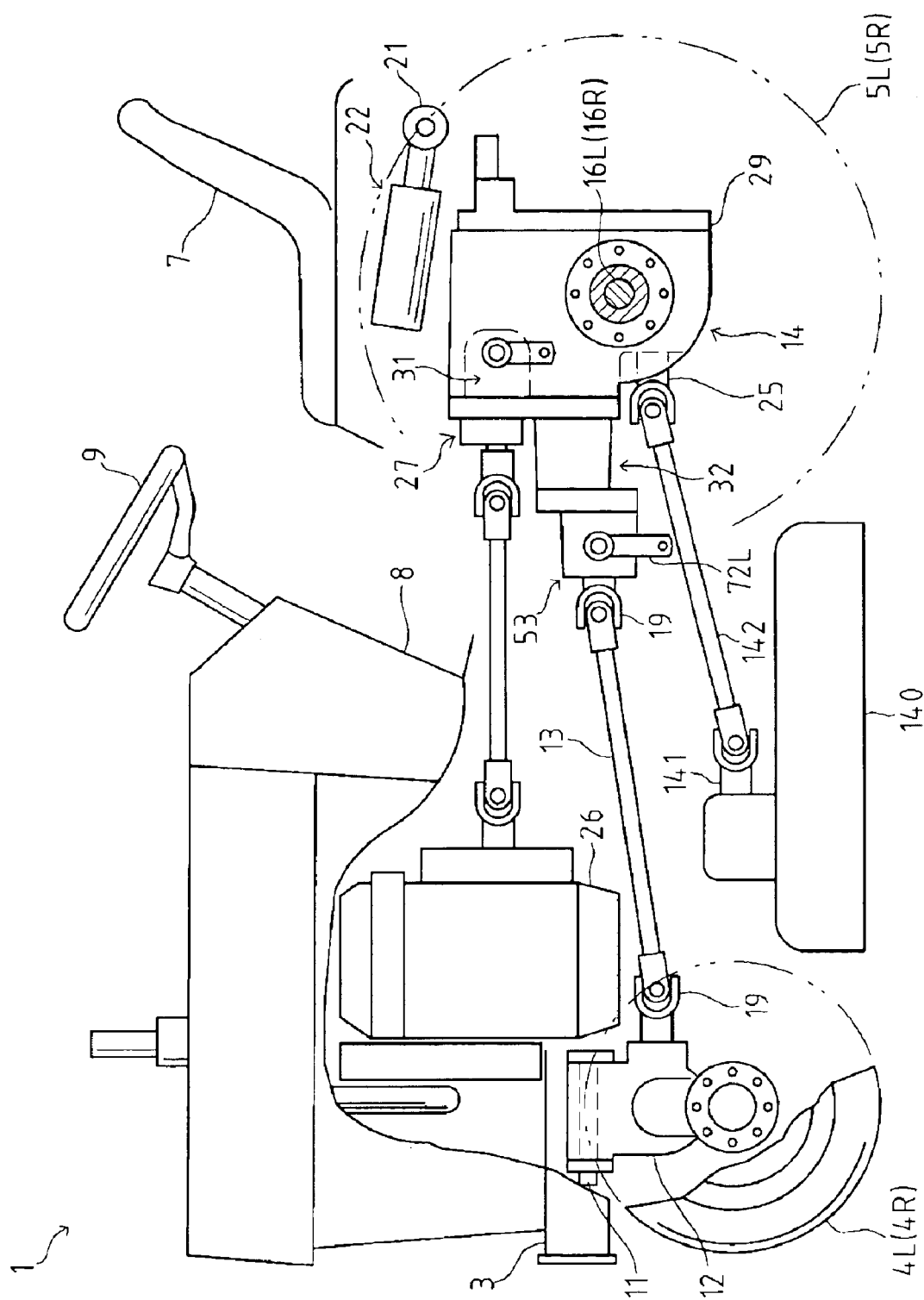
FIG. 1 is a side view of a lawn tractor as an example of a vehicle having a hydraulic four-wheel driving apparatus according to the present invention.

As shown in FIG. 1, a (mid-mount mower type) lawn tractor 1 serving as a four-wheel drive vehicle according to an embodiment of the present invention has a vehicle frame 3 extended in its longitudinal direction. Left and right rear ends of the vehicle frame 3 are attached to a front portion of a transmission casing 29 incorporating a transmission system 14. Left and right rear axle casings are laterally extended from left and right side surfaces of the transmission casing 29 supporting left and right rear axles 16L and 16R, respectively Unsteerable rear wheels 5L and 5R are attached onto outer ends of the rear axles 16L and 16R, respectively.

A mower 140 is supported at the intermediate bottom portion of the tractor 1. A mid PTO shaft 25 for driving the mower 140 projects forward from a lower portion of the transmission casing 29. An upper portion of the mower 140 supports a vertical input shaft 141. The input shaft 141 and the mid PTO shaft 25 are mutually connected through a transfer shaft 142 and universal joints.

A front axle casing 12 is pivoted at its lateral middle portion via a center pivot pin 11 having a longitudinal axis, to a front lower portion of the vehicle frame 3 in front of the mower 140 so that the front axle casing 12 can vertically rock at its left and right ends. Left and right steerable front wheels 4L and 4R are suspended from the left and right ends of the front axle casing 12.

The present hydraulic four-wheel drive system is applicable to not only the lawn tractor 1, but also an alternative vehicle such as a front-mount mower type lawn tractor, having unsteerable front wheels and steerable rear wheels.

A seat 7 is disposed above the transmission casing 29. A hydraulic lift device 22 having a hydraulic cylinder 21 for vertical movement of a rear-mount attachment (not shown) is disposed between the seat 7 and the transmission casing 29.

A dashboard 8 is provided upright on the longitudinal middle portion of the vehicle frame 3. An instrument panel and the like are provided on an upper surface of the dashboard 8, and a steering wheel 9 for steering operation of the front wheels 4L and 4R is also provided thereon.

Figure 2:
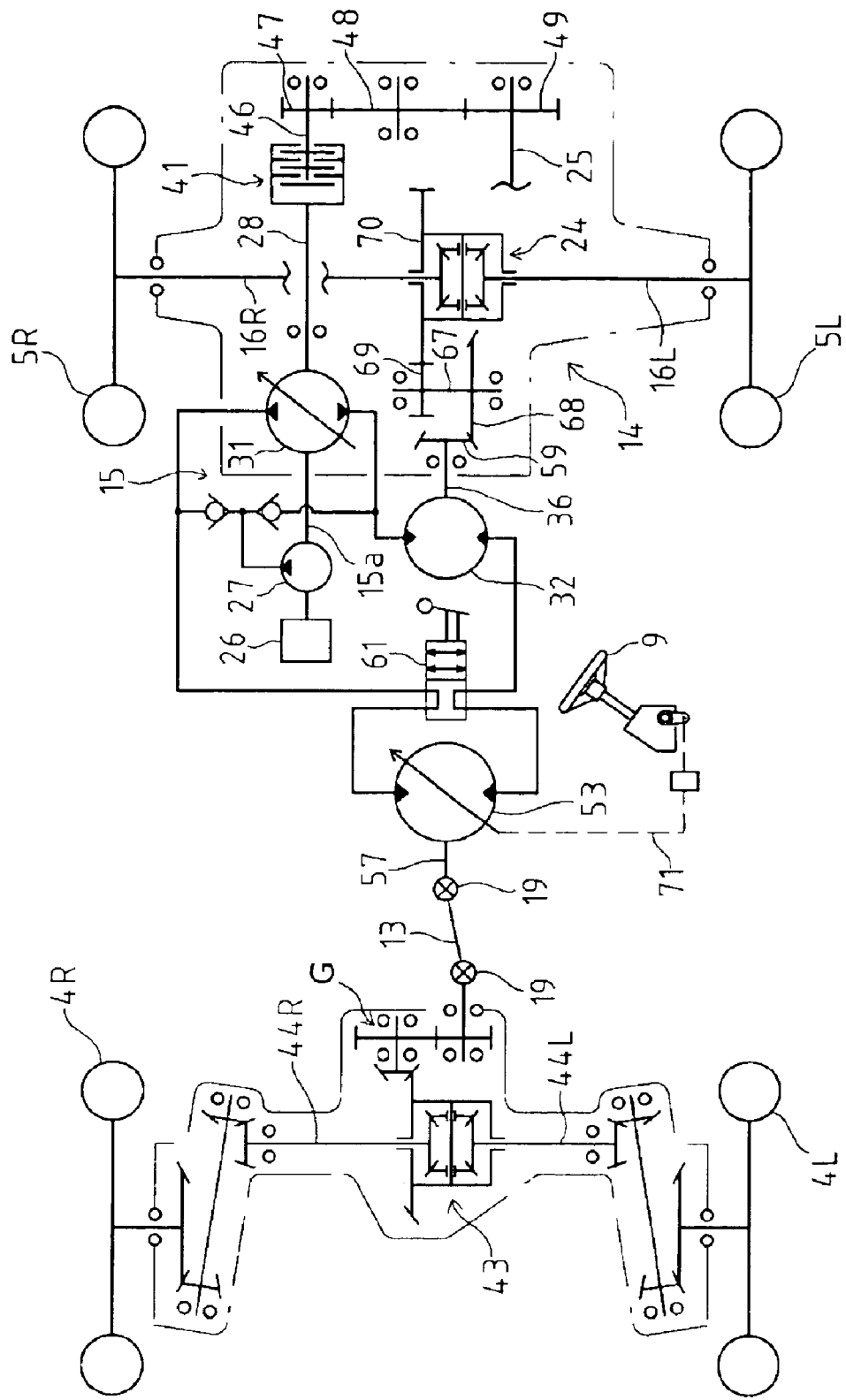
FIG. 2 is a structural diagram of the lawn tractor including a hydraulic circuit diagram of the hydraulic four-wheel driving apparatus.
Figure 3:
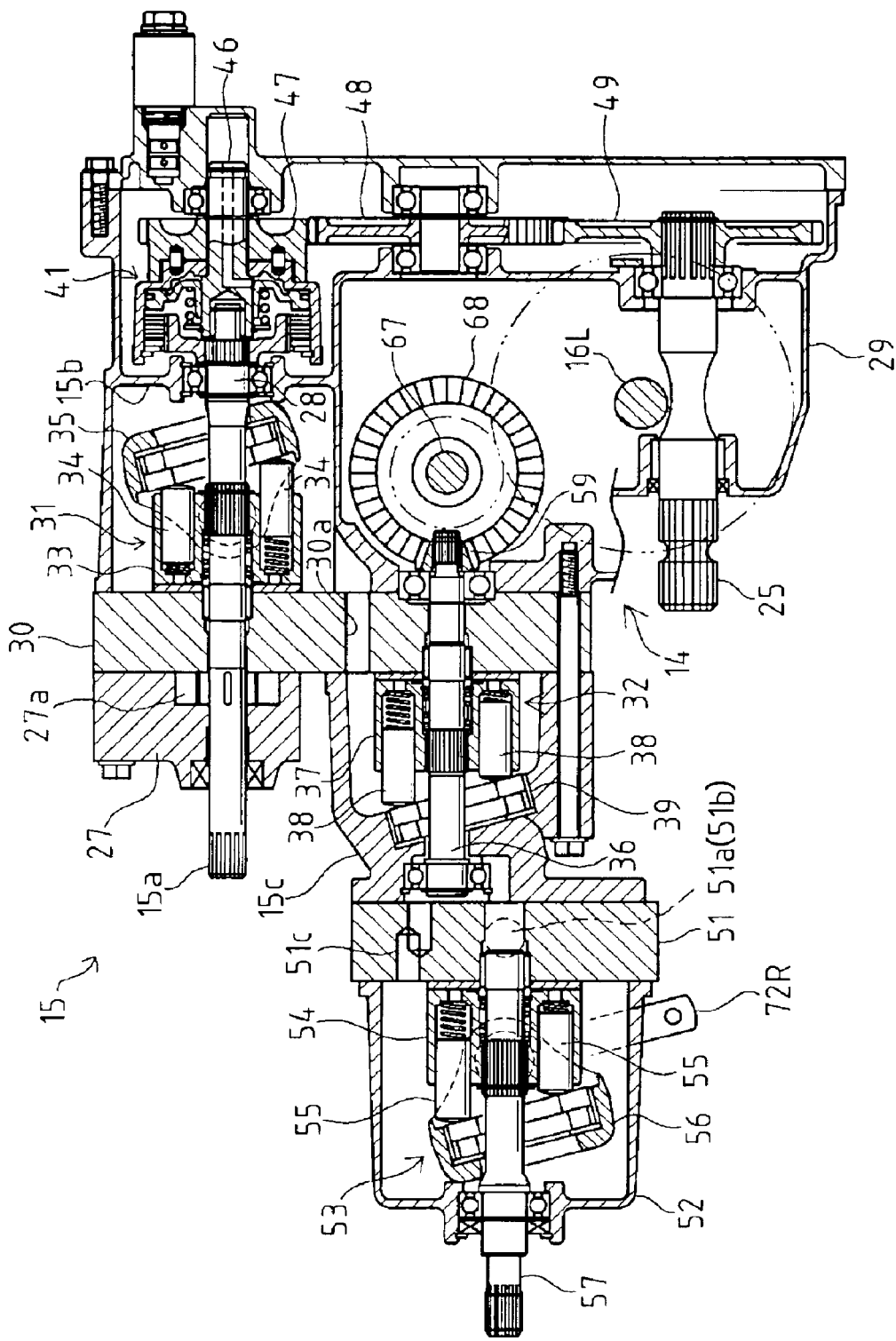
FIG. 3 is a sectional side view of a transmission casing constituting the hydraulic four-wheel driving apparatus.

As shown in FIGS. 2 and 3, the transmission 14 incorporated in the transmission casing 29 is a combination of a four-wheel driving HST 15 and a PTO gear train. The HST 15 is disposed at the front portion of the transmission casing 29, and the PTO gear train at the rear portion of the transmission casing 29. A forward projecting input shaft 15a is shared between the HST 15 and the PTO gear train. Below the input shaft 15a, the HST 15 has an unsteerable-wheel driving hydraulic motor 32 whose motor shaft 36, i.e., an unsteerable-wheel driving output shaft, for driving the unsteerable rear wheels 5L and 5R is extended into the transmission casing 29 to be drivingly connected to the rear axles 16L and 16R. The HST 15 also has a steerable-wheel driving hydraulic motor 53 in front of the hydraulic motor 32. The hydraulic motor 53 has a motor shaft 57, i.e., a steerable-wheel driving output shaft, projecting forward to drive the steerable front wheels 4L and 4R. The input shaft 15a, the output shafts 36 and 57 are disposed parallel in the longitudinal direction of the tractor 1.

The steerable-wheel driving output shaft 57 is positioned lower than the unsteerable-wheel driving output shaft 36 so as to reduce the gradient of a power transfer shaft 13 extended from the motor shaft 36 through universal joints 19 to be drivingly connected to the front wheels 4L and 4R whose rotary axis is lower than that of the rear wheels 5L and 5R. That is, the power transfer shaft 13 with the universal joints 19 on its both ends is as level as possible. This construction is advantageous in the durability and the silence of the universal joints 19.

An upright plate-like center section 30 is attached to the front surface of the transmission casing 29. A pump attachment surface is formed on an upper rear surface of the center section 30, and a motor attachment surface on a lower front surface thereof. A front portion of the transmission casing 29 behind the upper portion of the center section 30 serves as a pump housing 15b for housing an axial piston type hydraulic pump 31 attached to the pump attachment surface of the center section 30. A first motor housing 15c is attached to the lower front surface of the center section 30 and houses the unsteerable-wheel driving motor 32 for driving the rear (unsteerable) wheels 5L and 5R attached to the motor attachment surface of the center section 30.

Furthermore, an upright plate-like section 51 is attached to the front surface of the motor housing 15c, and a second motor housing 52 is fixed to the front surface of the section 51 so as to house the front-wheel driving motor 53 for driving the front (steerable) wheels 4L and 4R attached to the front surface of the center section 51. As shown in FIG. 2, the HST 15 is constructed by fluidly connecting the motors 32 and 53 to the hydraulic pump 31 in series.

Furthermore, a charge pump housing 27 involving a charge pump 27a is fixed to the upper front surface of the center section 30 opposite to the pump attachment surface (above the first motor housing 15c).

Figure 6:
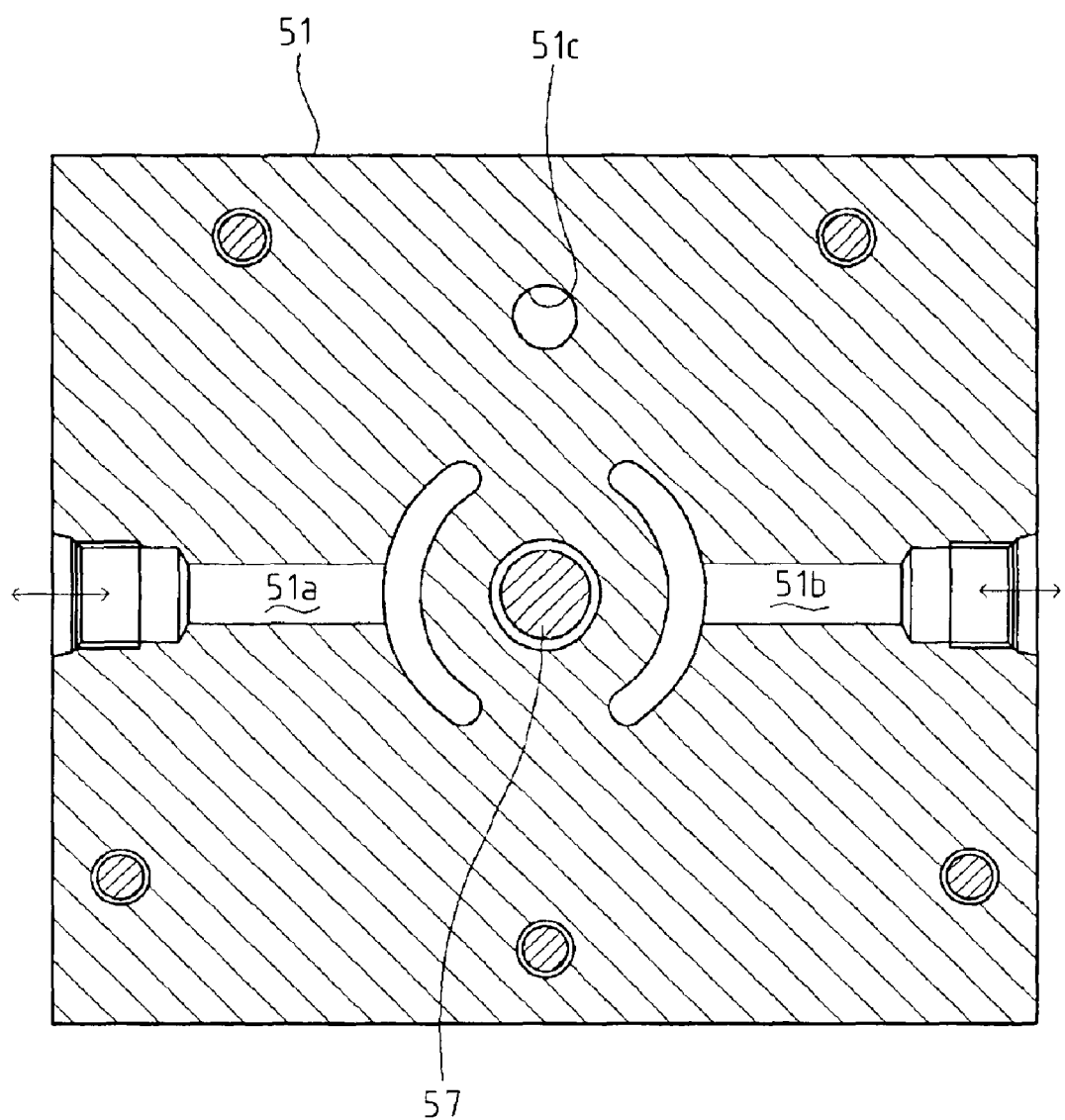
FIG. 6 is a sectional front view of a center section of the hydraulic motor for driving steerable wheels.

As shown in FIG. 6, the center section 51 is formed therein with an oil passage 51c for fluidly connecting an oil sump in the second motor housing 52 to an oil sump in the first motor housing 15c. The center section 30 is formed therein with an oil passage 30a for fluidly connecting the oil sump in the first motor housing 15c to oil sump in the pump housing 15b. Accordingly, hydraulic oil can be circulated among the second motor housing 52, the first motor housing 15c and the pump housing 15b, thereby being effectively refilled and cooled. The oil passage 51c disposed in the center section 51 is connected into the first motor housing 15c through a portion of the first motor housing 15c supporting the front end of the output shaft 36, thereby simply lubricating a bearing of the output shaft 36.

With regard to the hydraulic pump 31, as shown in FIG. 3, the input shaft 15a rotatably penetrates the charge pump housing 27 so as to drive the charge pump 27a, and rotatably penetrates the center section 30. The input shaft 15a projects rearward from the center of the pump attachment surface of the center section 30, and not-relatively rotatably penetrates a cylinder block 33 so as to serve as a pump shaft of the hydraulic pump 31. The cylinder block 33 is slidably and rotatably fitted onto the pump attachment surface of the center section 30. A plurality of cylinder holes are bored in the cylinder block 33, and respective pistons 34 are reciprocally slidably inserted into the cylinder holes through biasing springs. Heads of the pistons 34 abut against a movable swash plate 35. The input shaft 15a is further extended rearward through the swash plate 35. The swash plate 35 can be tilted in opposite directions from its neutral position. By operating an accelerator pedal (not shown) or the like provided on the tractor 1, the angle of the swash plate 35 is changed so as to change the stroke of the pistons 34, thereby steplessly changing the amount of oil delivered from the pump 31, or the direction of the swash plate 35 is switched so as to change the direction of oil delivered from the pump 31.

As shown in FIG. 6, the center section 51 is provided therein with an oil passage 51a for connecting a first kidney port of the steerable-wheel driving motor 53 to a first kidney port of the hydraulic pump 31 (through a later-discussed switching valve 61), and with an oil passage 51b for connecting a second kidney port of the steerable-wheel driving motor 53 to a first kidney port of the unsteerable-wheel driving motor 32 (through the switching valve 61). A second kidney port of the unsteerable-wheel driving motor 32 is connected to a second kidney port of the hydraulic pump 31 through an oil passage (not shown) bored in the center section 30.

With regard to the steerable-wheel driving motor 53, as shown in FIG. 3, the front-wheel driving motor shaft 57 is rotatably supported at its rear end by the substantially central front portion of the center section 51, and at its front portion by the front end portion of the second motor housing 52, and projects forward from the front end of the second motor housing 52. In the second motor housing 52, a cylinder block 54 is not-relatively rotatably fitted on the steerable-wheel driving output shaft 57. The cylinder block 54 is slidably rotatably fitted onto the front surface of the center section 51. Pistons 55 are reciprocally slidably inserted into respective cylinder bores in the cylinder block 54 through biasing springs. Heads of the pistons 55 abut against a movable swash plate 56. The steerable-wheel driving output shaft 57 freely penetrates the swash plate 56. The swash plate 56 has no neutral position and its oil-delivery direction relative to the oil-delivery direction of the pump 31 is constant even if it is tilted in any direction. By changing the angle of the movable swash plate 56, the stroke of the pistons 55 is changed to change the capacity of the hydraulic motor 53 relative to that of the hydraulic pump 31, thereby obtaining corresponding rotary speed of the steerable-wheel driving output shaft 57.

In the present embodiment, trunnion type movable swash plates are used as the movable swash plates 56 and 35 of the steerable-wheel driving motor 53 and the hydraulic pump 31. However, the type of the movable swash plates is not limited. Cradle type movable swash plates may be alternatively used.

Rotary force of the steerable-wheel driving output shaft 57 is transmitted to a front differential assembly 43 in the front axle casing 12 through the power transfer shaft 13 with the universal joints 19. Further, the force is transmitted from the front differential assembly 43 to left and right differential yoke shafts 44L and 44R, thereby driving the (steerable) front wheels 4L and 4R through respective final speed-reduction mechanisms.

With regard to the unsteerable-wheel driving motor 32, as shown in FIG. 3, the unsteerable-wheel driving output shaft 36 placed under and in parallel to the input shaft 15a is rotatably supported at its front end by the front portion of the first motor housing 15c, and rotatably penetrates the center section 30 through the center of the pump attachment surface. In the first motor housing 15c, the cylinder block 37 is not-relatively rotatably fitted on the output shaft 36. The cylinder block 37 is slidably rotatably fitted onto the motor attachment surface of the center section 30. Pistons 38 are reciprocally slidably inserted into respective cylinder bores in the cylinder block 37 through biasing springs. Heads of the pistons 38 abut against a fixed swash plate 39. The output shaft 36 freely penetrates the swash plate 39. The amount and direction of oil delivered from the hydraulic motor 53, i.e., the rotary speed and direction of the unsteerable-wheel driving output shaft 36 is changed by controlling the angle and direction of the swash plate 35 of the pump 31.

Referring to FIGS. 2 and 3, in the transmission casing 29, the unsteerable-wheel driving output shaft 36 is extended rearward from the center section 30 and fixedly provided on its rear end with a bevel pinion 59. Behind the bevel pinion 59 is extended a lateral counter shaft 67 with a large bevel gear 68 and a small gear 69 thereon. The bevel pinion 59 meshes with the large bevel gear 68. The counter shaft 67 may be used for braking. A rear differential assembly 24 for differentially connecting the left and right axles 16L and 16R is disposed below the gears 68 and 69, and a bull gear 70 of the rear differential assembly 24 meshes with the small gear 69. In this way, output of the hydraulic motor 32 is transmitted to the left and right (unsteerable) rear wheels 5L and 5R provided on outer ends of the respective axles 16L and 16R.

As shown in FIG. 2, the switching valve 61 having a four-wheel drive position and a two-wheel drive position is interposed between a closed circuit in the center section 30 and a closed circuit in the center section 51. When the valve 61 is set to its four-wheel drive position, it makes a closed circuit between the center sections 30 and 51 so as to fluidly connect both of the motors 53 and 32 to the pump 31 in tandem, thereby establishing a four-wheel drive mode. For example, when the tractor 1 travels forward, oil flows in the closed circuit from the pump 31 to the motor 32 through the motor 53 (or to the motor 53 through the motor 32) and returns to the pump 31, and when the tractor 1 travels rearward, oil flows from the pump 31 to the motor 53 through the motor 32 (or to the motor 32 through the motor 53, if oil flows from the pump 31 to the motor 53 through the motor 32 corresponding to forward traveling of the tractor 1), and returns to the pump 31. When the valve 61 is set to its two-wheel drive position, it makes a closed circuit between the pump 31 and motor 32 without the motor 53, and bypasses the motor 53 between the oil passages 51a and 51b, thereby establishing a two-wheel drive mode.

As shown in FIG. 6, the oil passages 51a and 51b formed in the center section 51 in communication with the steerable-wheel driving hydraulic motor 53 are open at left and right side surfaces of the center section 51, respectively, and connected to the switching valve 61 through piping such as hoses.

As shown in FIGS. 2 and 3, a rear portion of the input shaft 15a serves as a PTO clutch shaft 28, which is journalled through a bearing by a partition behind the swash plate 35, serving as the rear end of the pump housing 15*b*. The PTO clutch shaft 28 is further extended rearward from the partition to be selectively connected to a PTO input shaft 46 through a PTO clutch 41. A gear 47 fixed on a rear end of the PTO input shaft 46, a gear 49 fixed on the mid PTO shaft 25, and a gear 48 between the gears 47 and 49 are arranged along the rear end of the transmission casing 29 to mesh with one another, thereby constituting a PTO gear train between the PTO input shaft 46 and the mid PTO shaft 25. The mid PTO shaft 25 is disposed below the rear axles 16 and projects forward from the transmission casing 29 so as to drive the mower 140.

The input shaft 15*a* receives power from a power source outside the transmission casing 29. The lawn tractor 1, as shown in FIG. 1, is provided at its front portion with an engine 26 from which a power transfer shaft with universal joints is extended rearward to the input shaft 15*a* so as to transmit engine power to the input shaft 15*a*. The rotating input shaft 15*a* drives the charge pump 27*a* and the hydraulic pump 31 of the four-wheel driving HST 15, and drives the mid PTO shaft 25 via the PTO clutch 41 and the PTO gear train.

Figure 5:
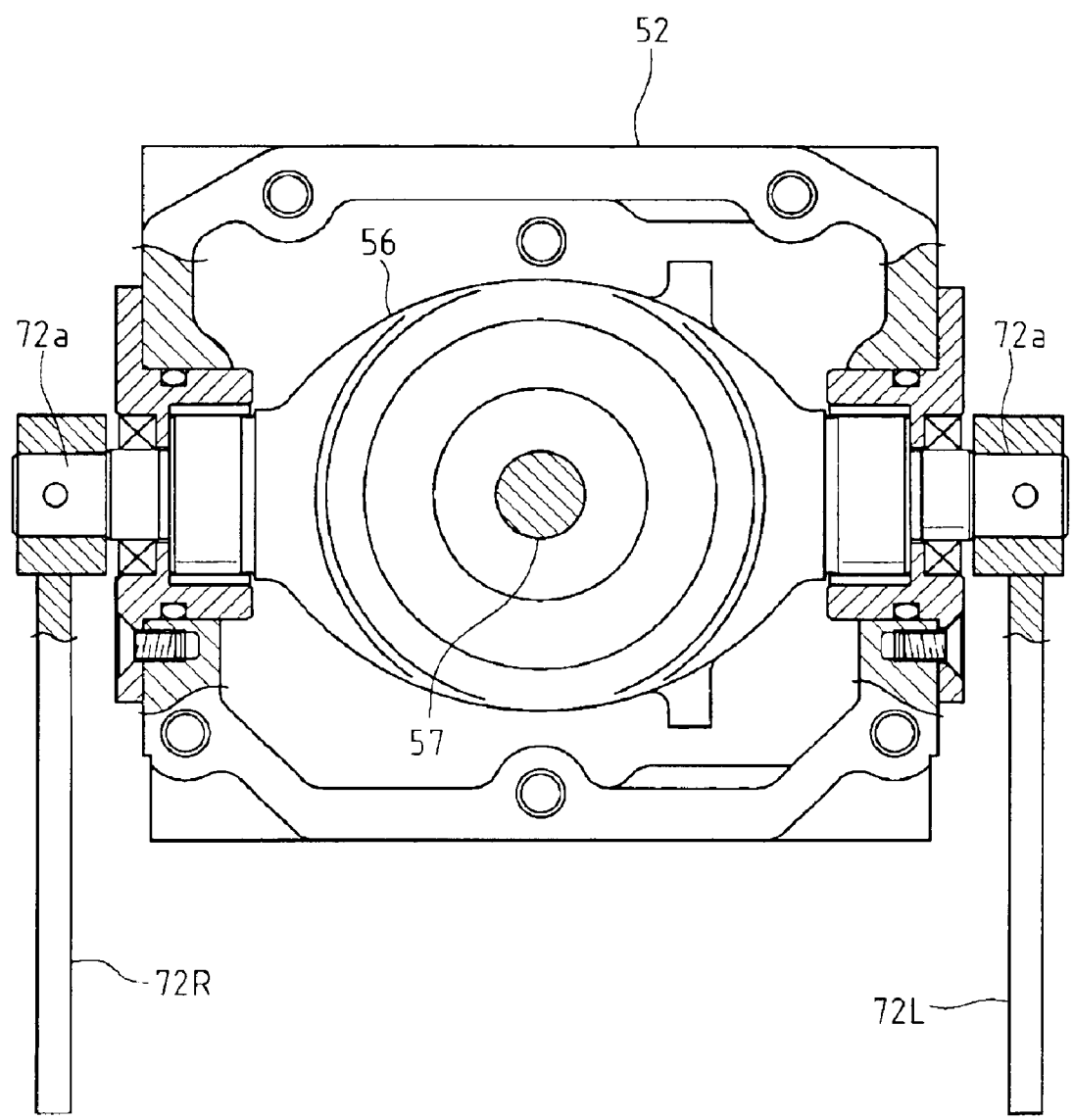
FIG. 5 is a sectional front view of a housing incorporating a hydraulic motor for driving steerable wheels, including a front view of its movable swash plate.

A front-wheel speed increasing system will be described. The movable swash plate 56 of the steerable-wheel driving hydraulic motor 53 is fittingly provided with later-discussed left and right control arms 72L and 72R (FIG. 5). According to increase of rotational angle of the steering wheel 9 from its straight traveling position, a linkage 71 moves to rotate the control arms 72L and 72R so that the swash plate 56 tilts to reduce the capacity of the motor 53. Therefore, speed of the front wheels 4L and 4R is increased corresponding to the turning angle of the tractor 1.

The movable range of the swash plate 56 or the capacities of hydraulic motors 32 and 53 are designed so that the minimum capacity of the hydraulic motor 53, when the steering wheel 9 is turned to the maximum degree, is not smaller than the fixed capacity of the unsteerable-wheel driving hydraulic motor 32. Therefore, rotary speed of the motor 53 does not exceed the maximum rotary speed of the motor 32 in any case. This design of hydraulic motor 53 prevents cavitation and improves durability. In the front axle casing 12, an acceleration gear train G is disposed on the upstream of the front differential assembly 43 so as to compensate for speed-reduction of the output shaft 57 caused by increased capacity of the motor 53 larger than that of the motor 32, whereby peripheral speed of the front wheels 4L and 4R becomes equal to that of the rear wheels 5L and 5R when the steering wheel 9 is set in its straight traveling position.

Figure 4:
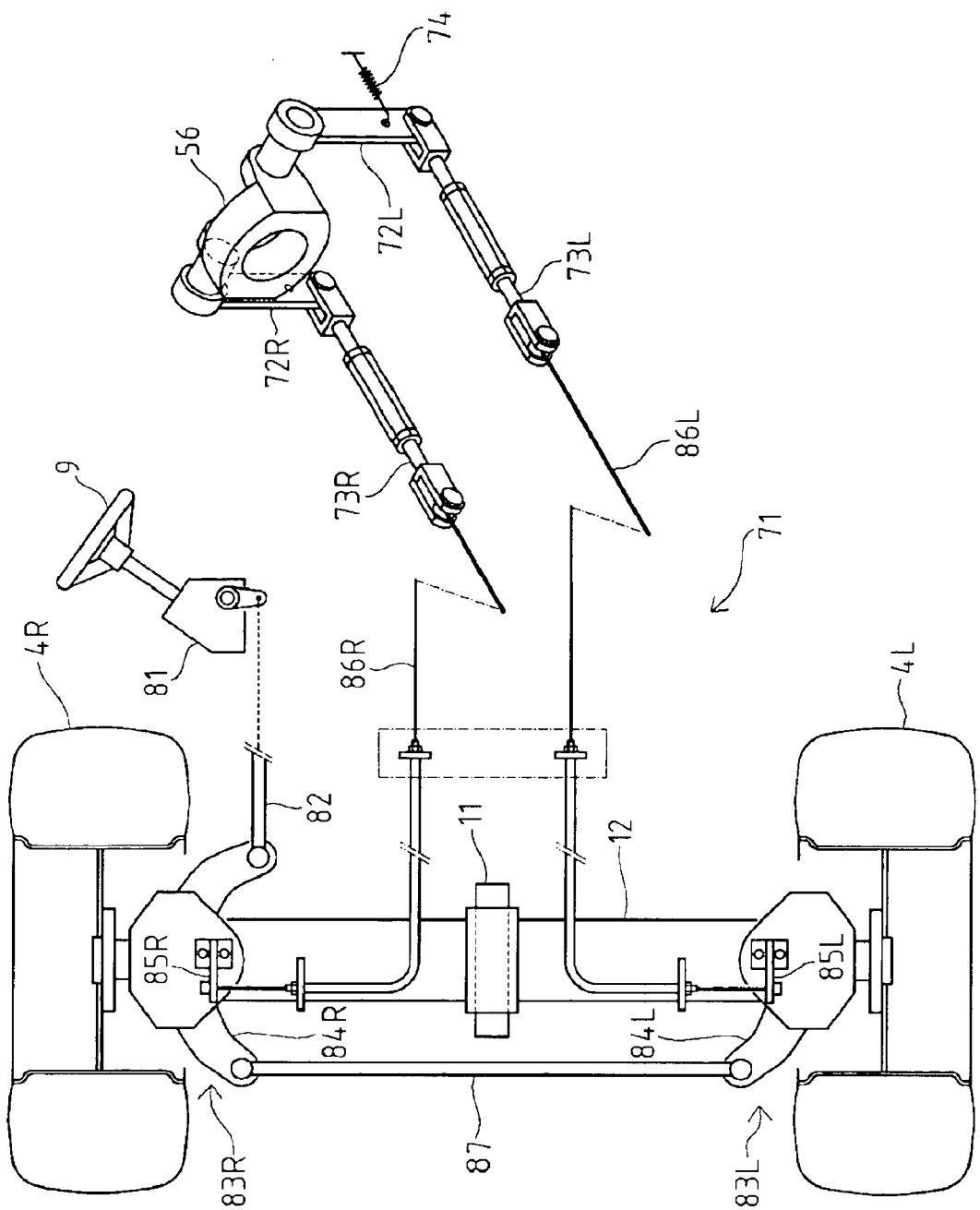
FIG. 4 is a structural drawing of a linkage system for increasing front-wheel speed in connection with the hydraulic four-wheel driving apparatus.

As shown in FIG. 4, the steering wheel 9 is interlockingly connected through a steering gear box 81 and a link rod 82 to a steering arm 84R attached to a right kingpin unit 83R supporting the right front wheel 4R. The steering arm 84R is connected through a tie rod 87 to a steering arm 84L attached to a left king pin unit 83L supporting the left front wheel 4L. Due to this construction, the left and right front wheels 4L and 4R turn substantially evenly according to rotation of the steering wheel 9. Left and right stays 85L and 85 R serving as sensors for detecting the steering angle are fixed onto the respective left and right kingpin units 83L and 83R. Wires 86L and 86R are extended from the stays 85L and 85R and connected to the control arms 72L and 72R through link rods 73L and 73R, respectively, thereby constituting the linkage 71. The lengths of the link rods 73L and 73R are adjustable so as to equalize the speed-increasing degree of the front wheels 4 whether the tractor 1 turns left or right.

Referring to FIG. 5, left and right trunnion shafts 72*a* of the swash plate 56 are rotatably supported by the left and right side portions of the second motor housing 52 and project laterally outward. The control arms 72L and 72R are fixed at their upper ends to the outward projecting portions of the trunnion shafts 72*a*, respectively. The control arms 72L and 72R are pivotally connected at their lower ends to the respective link rods 73L and 73R.

As shown in FIG. 4, at least one of the control arms 72L and 72R is connected at its intermediate portion to a spring 74. The spring 74 biases the control arms 72L and 72R rearward, thereby biasing the swash plate 56 toward its position for straight traveling of the tractor 1, where the angle of a surface of the swash plate 56 abutting against the pistons 55 from a surface perpendicular to the output shaft 57 reaches the maximum.

Alternatively, in order to ensure sufficient minimum road clearance below the vehicle frame 3, the rotary axis of the swash plate 56 (i.e., the trunnion shafts 72*a*) may be located in lower ends of the control arms 72L and 72R, and the linkage 71 may be disposed inside the vehicle frame 3 so as to be connected to upper ends of the control arms 72L and 72R. The vehicle frame 3 protects wires and the like of the linkage 71.

Due to the above construction, when the steering wheel 9 is turned right from its straight traveling position, for example, the link rod 82 connected to the steering gear box 81 is pushed forward so as to rotate the right and left kingpin units 83L and 83R rightward. Accordingly, the right stay 85R is rotated rightward together with the right kingpin unit 83R so as to pull the wire 86R and the link rod 73R forward and rotate the right control arm 72R forward, thereby reducing the angle of the surface of the swash plate 56 abutting against the pistons 55 from the surface perpendicular to the output shaft 57, that is, reducing the capacity of the motor 53, whereby the rotary speed of the output shaft 57 becomes larger than that when the tractor 1 travels straight. At this time, the left stay 85L rotating rightward together with the right kingpin unit 83L loosens the wire 86L so as to allow the left control arm 72L to rotate forward together with the right control arm 72R and the swash plate 56. When the steering wheel 9 is turned leftward from its straight traveling position, and vice versa.

When the steering wheel 9 is returned to its straight traveling position, the control arms 72L and 72R are rotated rearward by biasing force of the spring 74, and the swash plate 56 is finally located at the above-mentioned position for straight traveling of the tractor 1 by a (not shown) stopper, thereby canceling speed-increasing of the front wheels 4L and 4R.

Due to the above-mentioned linkage 71 and others, the angle of the swash plate 56 is determined corresponding to rotational degree of the steering wheel 9 from its straight traveling position, thereby changing the speed-increasing degree of the front wheels 4L and 4R. In comparison with a linkage having a single wire to be pulled and pushed, operational load on the two wires 86L and 86R of the linkage 71 can be lightened because only one of them is stretched when the steering wheel 9 is rotated either rightward or leftward from its straight traveling position. Therefore, the linkage 71 is advantageous in durability and reliability. Furthermore, the linkage 71 is so simple as to facilitate for easy maintenance of its members such as wires 86L and 86R and link rods 73L and 73R.

The hydraulic four-wheel driving apparatus according to the present invention is applicable to a vehicle that has front wheels and rear wheels at uneven distance from the turning center of the vehicle and requires speed variation of drive wheels during turning of the vehicle. A vehicle having four steerable wheels, if their uneven distance from the turning center is ensured, may employ the apparatus according to the present invention.

It is further understood by those skilled in the art that the foregoing description is a preferred embodiment of the disclosed apparatus and that various changes and modifications may be made in the invention without departing from the spirit and scope thereof.

What is claimed is:

1. A hydraulic four-wheel driving apparatus for a vehicle having a pair of left and right first drive wheels and a pair of left and right second drive wheels, the first drive wheels and the second drive wheels being distributed between the back and front of the vehicle, and at least the second drive wheels are steerable, comprising:
    a transmission casing supporting the first drive wheels;
    a hydraulic pump disposed integrally with the transmission casing, the hydraulic pump being driven by a power source outside the transmission casing;
    a first hydraulic motor for driving the first drive wheels fluidly connected to the hydraulic pump, the first hydraulic motor being disposed integrally with the transmission casing; and
    a second hydraulic motor for driving the second drive wheels fluidly connected to the hydraulic pump, the second hydraulic motor being disposed integrally with the transmission casing and disposed on one side of the first hydraulic motor toward the second drive wheels.

2. The hydraulic four-wheel driving apparatus as set forth in claim 1, wherein a rotary axis of the second hydraulic motor is disposed lower than a rotary axis of the first hydraulic motor.

3. The hydraulic four-wheel driving apparatus as set forth in claim 1, wherein a capacity of the second hydraulic motor is larger than a capacity of the first hydraulic motor.

4. The hydraulic four-wheel driving apparatus as set forth in claim 3, wherein the second hydraulic motor has a variable capacity and the minimum capacity of the second hydraulic motor is not smaller than the capacity of the first hydraulic motor.

5. The hydraulic four-wheel driving apparatus as set forth in claim 1, the second hydraulic motor being variable in capacity, further comprising:
    a movable swash plate for the second hydraulic motor; and
    a pair of left and right control arms for controlling the swash plate, the control arms being linked to the respective left and right second drive wheels, wherein each of the control arms is operated according to turning of the corresponding second drive wheels by steering operation.

* * * * *